United States Patent [19]

Wyss et al.

[11] Patent Number: 4,973,487
[45] Date of Patent: Nov. 27, 1990

[54] QUICK-COOKING THIN-WALL PASTA

[75] Inventors: Clement R. Wyss, Hillsdale, N.J.; Charles R. Mason, Yonkers, N.Y.; Edward L. Scarsella, Bedford Hills, N.Y.; Carmine Giuliano, Hartsdale, N.Y.

[73] Assignee: Kraft General Foods, Inc., Glenview, Ill.

[21] Appl. No.: 330,239

[22] Filed: Mar. 29, 1989

[51] Int. Cl.$^5$ .............................................. A23L 1/00
[52] U.S. Cl. ................................ 426/557; 426/330.1; 426/451
[58] Field of Search ..................... 426/451, 557, 330.1

[56] References Cited

U.S. PATENT DOCUMENTS 1,916,812  7/1933  Scotland ............................ 426/557
3,251,697  5/1966  Lineweaver et al. ............. 426/330.1
4,539,214  9/1985  Winter et al. ...................... 426/557

Primary Examiner—Donald E. Czaja
Assistant Examiner—Mary S. Mims
Attorney, Agent, or Firm—Thomas A. Marcoux; Linn I. Grim; Thomas R. Savoie

[57] ABSTRACT

The invention describes an improved quick-cooking, thin-wall dry uncooked macaroni. The dough utilized to produce the macaroni contains 0.5 to 5.0% of dried egg white solids. The dried egg white solids must critically have a pH value within the range of from 6.75 to 7.25, a solubility of greater than 90% and preferably a normal ovomucin content. The macaroni may be cooked within a 3–7 minute period, preferably by microwave radiation to produce cooked macaroni of an "al dente" texture.

4 Claims, No Drawings

… …

QUICK-COOKING THIN-WALL PASTA

TECHNICAL FIELD

The present invention relates to an improved, quick-cooking, uncooked, thin-wall, dry pasta designed to be prepared in hot water or sauce to achieve a desirable "al dente" eating texture preferably in a microwave oven within approximately five minutes total preparation time.

BACKGROUND ART

Conventionally pasta is made by mixing wheat flour or durum semolina and water. The product shape is formed by extrusion of the mixture through a die and the product is then dried under controlled temperature and humidity. Typically drying has been for six or more hours at temperatures of up to 75° C. and relative humidities up to 85%. This slow drying has been necessary to prevent cracking and checking in the product. Such products may be rehydrated by cooking in boiling water for any time from about ten minutes to twenty minutes. Prior to this cooking, that is prior to when the product is prepared for eating, the protein and starch of the product remain essentially in their natural states and no denaturation of the protein or gelatinization of the starch occurs until it is cooked. When conventional pasta (e.g., spaghetti) is cooked it is often thought desirable to cook it to a texture or state, usually referred to as "cooked to al dente", at which it is not soft but instead presents some resistance to the teeth to give it a degree of chewiness. When cooked to this "al dente" texture, the pasta product throughout much of its body or bulk exhibits mainly denatured protein and gelatinized starch, but in a central core or zone a substantial amount of denaturized protein and ungelatinized starch remains.

There have been various proposals for making a quick-cooking product but these proposals have not been entirely satisfactory for various reasons. It has been proposed, for example, to form the products of the spaghetti and macaroni types with thin-walled tubular sections instead of the relatively thick-walled sections found in products made by conventional practice, the theory being that the thinner the walls of the tubular sections, the quicker and more thoroughly they will cook. It has been found in practice, however, that the thin walls have a strong tendency to collapse when boiled in water in accordance with usual cooking methods. When the walls collapse during cooking, not only does the food present a somewhat non-appetizing mass but collapse of the walls hinders the contact of the cooking medium juices, seasoning, etc. with the interior walls. It is highly desirable, therefore, that collapse of the tubular walls be prevented. Merely making the walls thin is thus not a practical solution to the problem of making the products quick-cooking. It has also been proposed to incorporate strengthening materials in the product during its manufacture to prevent the sagging and collapsing of the thin side walls. The strengthening materials which have been proposed are, however, relatively expensive and materially increase the cost of manufacture. Since spaghetti, macaroni and the like are widely used as a low-cost food of high nutritive value, an expedient which takes this food out of the low-cost category is obviously not desirable.

There remains a need in the art to prepare a thin-wall pasta product in the uncooked state which can be rapidly prepared with hot water or sauce to produce a finished pasta possessing an "al dente" texture.

DISCLOSURE OF THE INVENTION

The present invention relates to an improved quick-cooking, thin-wall dry uncooked pasta which can be rapidly cooked with boiling water or sauce to produce a cooked pasta of "al dente" texture. This improvement is achieved by the incorporation into the pasta dough of from 0.5% to 5.0% dry basis of dried egg white solids. The dried egg white solids must be selected such that it possesses a pH of from 6.75 to 7.25, a solubility of greater than 90% and preferably an ovomucin content which falls within the normal level (as a percentage of solids contained within the total egg white). This normal range typically will correspond to an ovomucin content of from 2.5% to 3.5% of the egg white solids, dry basis. The pasta so formed can be rapidly cooked within 3–7 minutes, preferably in a microwave oven, to an "al dente" texture and it will also possess structural strength and acceptable surface starch control (without an excess of starchy recipe water).

BEST MODE FOR CARRYING OUT THE INVENTION

The improvement which is the subject of this invention is critically reliant on the characteristics of the dried egg white employed. The egg white solids must have a pH within the range of 6.75 to 7.25. The method for determining the pH is as follows: egg white is solubilized to achieve a 10% solution which is subject to analysis by using a Corning pH meter Model No. 140 to yield a pH reading.

The dried egg white solids must achieve a solubility of greater than 90%. The method of determining solubility of the dried egg whites is as follows: (1) 180 ml of 80° F. tap water is placed in a 500 ml beaker. (2) The beaker is placed on a magnetic stirrer and mixed at medium speed to form a vortex. (3) Into the vortex 20 grams of powdered egg white is added and continued to stir for 5 minutes while gradually increasing the mixer speed. Total egg white sample is in solution—dissolved or suspended. (4) The complete mixture is poured into a 250 ml centrifuge bottle. (5) The samples is centrifuged for 10 minutes at 10,000 rpm. (6) The centrifuged solutes are carefully decanted into 250 ml beakers, and the remaining residue (insolubles) is placed into a foil moisture dish. (7) Both components are placed in a vacuum oven (160° F./25 inches Hg) for a total of 60 hours. (8) The samples are removed, placed in a dessicator for 1 hour to equilibrate, weighed, and % solids are calculated.

The dried egg white solids should preferably contain an ovomucin content within the normal range. This means the ovomucin content must be essentially similar to the percentage of ovomucin present in a typical dried egg albumin. This normal range corresponds to a percentage within the range of from 2.5% to 3.5% of the egg white solids, dry basis.

The dried egg white solids are incorporated into the pasta dough at a level within the range of from 0.5% to 5.0%. Below 0.5% the effect of the egg white solid is minimal. The preferred level ranges from 0.75% to 2%. The Standards of Identity for Macaroni and Noodle Products found in 21 CFR part 139 specify that egg white, frozen egg white or dried egg white may comprise between 0.5% to 2.0% by weight of a finished macaroni food product.

The preparation of the dough and the processing thereof is accomplished by employing conventional apparatus and methods. The dough is made up of wheat flour, the egg white solids, water and optionally glyceryl monostearate in a quantity not to exceed 2% by weight of the finished food product (as set forth in the above-identified Standards of Identity). The wheat flour may include semolina, durum flour, farina or similar flour. Sufficient water is added to the dry mix ingredients such that the dough contains roughly 25 to 35% moisture. Thereafter the dough is kneaded and formed by extrusion into the desired thin-wall shape. Preferably the wall thickness of the dry macaroni will range from 0.020 inches to 0.030 inches. The pasta dough can be extruded into a multitude of thin-wall pasta shapes such as shells, twists, rotini, spirals, etc. Thereafter the pasta is dried in any known manner, preferably by air drying to a stable moisture content of less than about 13% and subsequently packaged.

The consumer may cook the product by placing it in boiling water on a conventional range top for approximately 3 to 5 minutes. Preferably the product is cooked in a microwave oven. The dry uncooked pasta is combined with a measured amount of water and the combination is placed into a microwave oven at the high power setting for 4 to 7 minutes. The amount of water for microwave cooking may be selected such that after hydration/cooking there is little or no pour-off of water. After microwave cooking, the consumer need not drain water off of the pasta. The cooked pasta possesses a clean, starch-free mouthfeel with a desirable "al dente" eating quality. The present formulation allows for the production of a multitude of complex pasta shapes without exhibiting collapse in the hydrated condition.

The following Examples illustrate certain embodiments of the present invention. The Examples are not meant to limit the invention beyond what is claimed below.

EXAMPLE 1

An uncooked thin-wall pasta was produced which contained the following ingredients as set forth below:

|  | Batch Wt. Grams | Total % | Dry Basis % |
| --- | --- | --- | --- |
| Durum, Extra Fancy Patent Flour | 3880 | 75.34 | 97.00 |
| Glycerol Monostearate (GMS) | 40 | .78 | 1.00 |
| Powdered Egg White | 80 | 1.55 | 2.00 |
| Water | 1150 | 22.33 | — |
| TOTAL | 5150 | 100.00 | 100.00 |

The powdered egg white was Henningsen Egg White Solids—Spray—Type P-20 manufactured by Henningsen Foods, Inc. of Omaha, NE. This particular egg white has a pH of 7.0 and a normal ovomucin content and a solubility of 93.2%. This particular egg white formulation has incorporated into it a maximium of 0.1% sodium lauryl sulfate.

All of the dry ingredients were dry blended in a 20 qt. Hobart mixer equipped with a bowl and cookie cutter type paddle. To this dry blended mixture the water was slowly added and after all the water has been added the mixing continued for an additional 2 minutes at speed #1. The speed was changed to speed #2 and mixing continued for 1 minute. The speed was returned to speed setting #1 and mixing continued for 2 additional minutes. The dough which resulted was transferred to a pilot plant De Maco Pasta Extruder equipped with a thin-wall die to produce an elbow macaroni of 0.020 inch thickness. The pasta dough was extruded at reduced capacity, specifically mixer speed 78 rpm, cutter speed 19 rpm and a 20" Hg vacuum back pressure at the die.

Thereafter the extruded macaroni was dried utilizing a Blue M drier Model No. FRH 381C. The dryer was set to a wet bulb reading of 118° F. and a dry bulb reading of 125° F. The extruded pasta was placed on perforated trays and dried for approximately 22 hours until a finished moisture of less than 10% was achieved.

The pasta was then prepared for consumption by cooking in a microwave oven as follows: approximately 42 grams of macaroni prepared according to the above-identified process was placed in a microwave dish along with a dry mix of seasoning and cheese which weighed approximately 26 grams. One cup of warm water was added and the combination was mixed and subsequently placed into the microwave oven where it was cooked uncovered at the high setting for approximately 5 minutes. After the dish was removed from the microwave the contents were stirred and let stand for 2 minutes.

EXAMPLE 2

A number of pilot plant runs similar to the process set forth in Example 1 were conducted to evaluate a wide variety of egg whites produced by Henningsen Foods, Inc. of Omaha, Nebr. as well as other manufacturers. Thin wall pastas were produced from the exact percentage formulation set forth in Example 1 except that different dried egg whites were substituted. The pasta dough was extruded through a De Maco Pasta Press equipted with a ¼ inch elbow die. After the pasta was dried it was cooked in a microwave oven as follows: approximately fifty (50) grams of pasta were combined with one hundred sixty (160) grams of water and the combination was placed in a microwave oven at the high power setting for 2½ minutes, stirred and cooked for an additional 2½ minutes partially covered. The products were then organoleptically tested by a trained taste panel. The results are listed below in Table I. All dried egg whites in this run were manufactured by Henningson Foods, Inc. The ovomucin levels are supplied by the manufacturer. The pH and solubility was determined according to the above-identified procedures.

TABLE I

| Egg White Sample | pH | % Solubility | Ovomucin Level | Visual | Organoleptic Evaluation |
| --- | --- | --- | --- | --- | --- |
| PF-1 | 5.05 | 46.95 | HIGH | BAD SOFT | BAD, SOFT, MUSHY, PASTY |
| P-11 | 6.48 | 87.60 | ABOVE | GOOD | GOOD, FIRM BUT SLIGHTLY MEALY AND PASTY |

TABLE I-continued

| Egg White Sample | pH | % Solubility | Ovomucin Level | Visual | Organoleptic Evaluation |
|---|---|---|---|---|---|
| P-110 | 6.96 | 97.35 | NORMAL | VERY GOOD FIRM | VERY GOOD, FIRM, CLEAN, CLEAR POUR-OFF |
| P-20 | 7.0 | 93.2 | NORMAL W/SLS | GOOD FIRM | VERY GOOD, GOOD STRUCTURE, CLEAN, FIRM, TRANSLUCENT |
| P-19 | 7.06 | 93.0 | NORMAL | GOOD FIRM | GOOD, FIRM, CLEAN |
| P-21 | 9.2 | 94.65 | NORMAL | POOR PASTY | POOR, VERY, PASTY |

The PF-1 product is specified by manufacturer as being "ideal for use as a binder in pasta". However as reported above, the incorporation of this dried egg white resulted in an inferior product.

Additional pilot plant runs were conducted to compare thin wall pasta products prepared from different dried egg whites in a similar manner as reported above. The results are set forth in Table II below:

TABLE II

| Egg White Sample | pH | % Solubility | Ovomucin Level | Visual | Organoleptic Evaluation |
|---|---|---|---|---|---|
| HEN PF-1 | 5.05 | 46.95 | HIGH | BAD SOFT | BAD, SOFT, MUSHY, PASTY |
| HEN P-18G | 5.06 | 96.20 | BELOW NORMAL | SL FIRM STARCHY | POOR, SLIGHTLY FIRM, STARCHY |
| HEN P-18 | 5.30 | 89.8 | NORMAL W/SLS | SOFT PASTY | POOR, SOFT, PASTY |
| BAL C-30 | 6.09 | 95.3 | — | GOOD SL FIRM | FAIR, SLIGHTLY FIRM, NOT STARCHY |
| HEN P-11 | 6.48 | 87.6 | ABOVE NORMAL | GOOD SL FIRM | GOOD, SLIGHTLY FIRM |
| BAL ANGEL | 6.65 | 93.9 | — | FAIR SL FIRM | FAIR, SLIGHTLY FIRM, NOT STARCHY |
| BAL H-40 | 6.9 | 95.95 | — | GOOD SL FIRM | GOOD, FIRM, CLEAN, NOT STARCHY |
| HEN P-110 | 6.96 | 97.35 | NORMAL | VERY GOOD FIRM | VERY GOOD, VERY FIRM, VERY CLEAN, CLEAR POUR-OFF |
| HEN P-20 | 7.0 | 93.20 | NORMAL W/SLS | VERY GOOD FIRM | VERY GOOD, GOOD STRUCTURE, CLEAN, FIRM, TRANSLUCENT |
| HEN P-19 | 7.06 | 93.0 | NORMAL | GOOD FIRM | GOOD, VERY FIRM, CLEAN |
| HEN P-21 | 9.2 | 94.65 | NORMAL | VERY PASTY STARCHY | GOOD, SLIGHTLY FIRM, PASTY, SLIGHTLY PASTY |

In Table II HEN stands for dried egg white products manufactured by Henningsen Foods, Inc. and BAL stands for dried egg white products manufactured by Ballas Egg Products Corp. of Zanesville, Ohio. The ovomucin contents are as supplied by the manufacturer, as can be seen Ballas was unable to supply ovomucin content numbers. The pH and solubility were determined by the present inventors according to the above-identified procedures.

An addition pilot plant run was conducted and thin wall products containing different dried egg whites were evaluated and the pastas were given a numerical rating of quality from 1–10. The scale used was as follows:

| Poor | 1.0–2.5 |
|---|---|
| Fair | 2.6–5.0 |
| Good | 5.1–7.5 |
| Excellent | 7.6–10 |

The results of the evaluation are reported in Table III below:

TABLE III

| Egg White Sample | pH | % Solubility | Ovomucin Level | Numeric Evaluation | Comments |
|---|---|---|---|---|---|
| HEN PF-1 | 5.05 | 46.95 | HIGH | 2 | HIGH SURFACE STARCH, STICKS TOGETHER, SOFT, MEALY |
| HEN P-18G | 5.06 | 96.20 | LOW | 4 | SLIGHTLY FIRM, NOT AS GOOD AS P-20, RUBBERY |
| BAL ANGEL | 6.65 | 93.90 | — | 4 | SLIGHTLY STARCHY, HIGH SURFACE STARCH |
| BAL C-30 | 6.09 | 95.30 | — | 5 | FAIR/GOOD, FIRM, SLIGHTLY SOFTER THAN |

TABLE III-continued

| Egg White Sample | pH | % Solubility | Ovomucin Level | Numeric Evaluation | Comments |
|---|---|---|---|---|---|
| HEN P-11 | 6.48 | 87.60 | ABOVE NORMAL | 5 | P-20 CHEWY & MEALY AT END OF CHEW, MORE SURFACE STARCH THAN P-20 |
| BAL H-40 | 6.90 | 95.95 | — | 7 | COMPARABLE TO P-20, MAYBE SLIGHTLY BETTER |
| HEN P-19 | 7.06 | 93.00 | NORM. | 7.5 | SLIGHTLY STARCH AND PASTY, AS GOOD AS P-20 |
| HEN P-20 | 7.00 | 93.20 | NORM. | 8 | GOOD QUALITY |
| HEN P-110 | 6.96 | 97.35 | NORM. | 9 | GOOD TEXTURE, CLEAN, EXCEPTIONAL |
| HEN P-21 | 9.20 | 94.65 | NORM. | 5.5 | SLIGHTLY FIRM, MEALY, CHEWY, PASTY, SLIGHTLY COMPARABLE TO P-20 |
| HEN P-18 | 5.30 | 89.80 | NORM. | 3 | POOR, SOFT, PASTY |

We claim:

1. An improved quick-cooking thin-wall dry uncooked macaroni product wherein the improvement comprises the incorporation of from 0.5 to 5.0% of dried egg white solids into the pasta dough, said egg white solids having a pH within the range of from 6.75 to 7.25 and a solubility of greater than 90%.

2. The product of claim 1 wherein the dried egg white solids contain an ovomucin content within the range of from about 2.5% to about 3.5% of the dried egg white solids.

3. The product of claim 2 wherein the wall thickness of thin-wall dry macaroni ranges from 0.020 inches to 0.030 inches.

4. The product of claim 1 wherein the level of dried egg white solids ranges from 0.75% to 2.0%.

* * * * *